US008661254B1

(12) United States Patent
Sama

(10) Patent No.: US 8,661,254 B1
(45) Date of Patent: Feb. 25, 2014

(54) AUTHENTICATION OF A CLIENT USING A MOBILE DEVICE AND AN OPTICAL LINK

(75) Inventor: Venkata Babji Sama, Bangalor (IN)

(73) Assignee: CA, Inc., Islandia, NY (US)

( * ) Notice: Subject to any disclaimer, the term of this patent is extended or adjusted under 35 U.S.C. 154(b) by 60 days.

(21) Appl. No.: 13/309,217

(22) Filed: Dec. 1, 2011

Related U.S. Application Data

(60) Provisional application No. 61/419,640, filed on Dec. 3, 2010.

(51) Int. Cl.
*H04L 9/00* (2006.01)
(52) U.S. Cl.
USPC .............................. 713/168; 726/5; 380/247
(58) Field of Classification Search
USPC ................ 726/2, 4–5, 19; 713/168, 176, 179; 380/247
See application file for complete search history.

(56) References Cited

U.S. PATENT DOCUMENTS 8,200,260 B2 * 6/2012 Rouse et al. .................. 455/466
8,261,089 B2 * 9/2012 Leon Cobos et al. ......... 713/185

* cited by examiner

*Primary Examiner* — Samson Lemma
(74) *Attorney, Agent, or Firm* — Vierra Magen Marcus LLP

(57) ABSTRACT

Systems and methods for enhancing the convenience, reliability and security of transactions are provided. In authenticating a user attempting to engage in a transaction, a machine-readable indicia may be optically acquired and a challenge derived therefrom sent to a one-time password (OTP) application running on a mobile or other device. The device may then generate a response OTP using, at least in part, the derived challenge. The response may be read by a user and used in-band or may alternatively be sent by the mobile device out-of-band to an authentication server, which may respond with an authentication response operable to authenticate the user.

20 Claims, 6 Drawing Sheets

AUTHENTICATION OF A CLIENT USING A MOBILE DEVICE AND AN OPTICAL LINK

CROSS-REFERENCES TO RELATED APPLICATIONS

This application claims benefit under 35 U.S.C. 119(e) of U.S. Provisional Patent Application No. 61/419,640 filed on Dec. 3, 2010, which is herein incorporated by reference in its entirety for all purposes.

BACKGROUND

There has been an unprecedented increase in the number of commercial and financial transactions being conducted online using, for example, mobile devices such as cellular telephones, PDAs, and laptop computers. For example, a user may purchase or sell a product or service, barter, exchange, set up an auction, open, maintain, or administer an account with a financial institution, or conduct any number of other types of business transactions online and from a mobile device. There have also been a variety of techniques developed to secure these transactions. For example, various encryption and authentication protocols exist that offer reliably strong security and/or authentication. These protocols typically offer this increased security at the cost of increased administration, increased processing requirements, and decreased convenience to the user, such as the need for complicated setup and user configuration to support protocols for encryption, authentication, or both.

Security in a mobile setting has been studied and simulated. Encryption of the data in motion is one way of securing wireless communications. For example, Wi-Fi Protected Access ("WPA") or Wired Equivalent Privacy ("WEP") can be used for encryption of data in a mobile setting. As an example, U.S. Pat. No. 7,721,325 to Lee et al. describes a scheme for secure wireless communications. In this scheme, a station that wants to associate itself in a wireless network that has an access point generates a first key, and the access point generates a second key. A security key is generated as a function of the first key, the second key, a third key, and an initial key. The third key generation information and the security key are sent to the station. The station may then use the key generation information and the security key for communications within the network.

As another example, U.S. Pat. No. 7,457,409 to Lin et al. describes another scheme for secure communications in a wireless network. In this scheme, a host processing unit maintains multiple queues, and the networking module has an arbiter and a security engine. The arbiter decides which queue will be serviced next. The security engine fetches data from the queue chosen by the arbiter and encrypts or decrypts the data using a cipher.

Standards supporting strong authentication in addition to encryption are now being developed. One such industry initiative is called OATH for Open AuTHentication. EMV is another standard advanced by Europay, Mastercard, and Visa for authenticating credit and debit card transactions. This standard supports interoperation of chip cards, POS terminals, ATMs, etc. One-Time Passwords ("OTPs") may be used to secure the transactions. An OTP may include a token or code that can be used for a single transaction or part of a transaction, and thus used once. After every use, the OTP may change to a new value. An OTP can be a function of an encryption key or some other shared secret, and one or more other factors such as time, transaction details, a unique user identifier, location, etc.

The OATH proponents have realized that some applications would benefit from an asynchronous authentication system, such as a challenge-response ("CR") scheme, and thus have proposed the OATH Challenge Response Algorithm ("OCRA"). In a basic CR scheme, one party, such as a server that a client is trying to access, presents another party, the client, with a question or challenge. The queried party must provide a valid response to the question in order to be successfully authenticated and allowed access to the system or one of its resources. To address the insecure channel problem, many cryptographic solutions involve two-way authentication, where both the user and the system must each convince the other that they know a shared secret, such as a password, without this secret ever being transmitted clearly over the communication channel, where eavesdroppers might intercept the shared secret.

Most CR protocols used for authentication using mobile devices involve a user inputting a challenge into an application running on a mobile device. The challenge is typically between 8 and 16 bytes in length and may take the form of a string of characters, a word, or a short phrase. After the user inputs the challenge data into the mobile device, the application may generate the appropriate response. Entry of this challenge data, however, into the mobile device is often an error-prone and time-intensive task. This task may also be quite inconvenient or sometimes practically infeasible for the user. For example, a user may wish to initiate an immediate real-time transaction; however, the user may not be able to input the challenge quickly enough in order to execute the transaction. As another example, a user may mistype the challenge data, resulting in an invalid response, and hence a failed authentication attempt that requires the user to restart the CR process all over again. What is needed are novel ways of performing authentication in a mobile network.

BRIEF SUMMARY

In view of the foregoing, systems and methods for more convenient and efficient client authentication using a mobile or other device are provided. Encoded challenge data for a challenge-response ("CR") scheme may be displayed to a user. For example, the challenge data may be displayed in a webpage or stand-alone application or module. The user may establish an optical link with the encoded challenge data, using a mobile or other device. For example a camera, scanner, or other optical device integrated with or attached to the mobile device may be used to establish the optical link. In response to establishing the optical link, the challenge data may be automatically decoded and transferred to a CR module on the device. A response such as an OTP may then be automatically generated by the CR module based, at least in part, on the challenge data. The response may then be delivered in-band or out-of-band to an authentication server that authenticates the client.

Methods are also described for responding to an authentication challenge with a mobile device. The mobile device may have an optical recognition device communicatively coupled with the mobile device. The methods may include receiving an encoded authentication challenge using the optical recognition device. The methods may also include decoding the encoded authentication challenge, and processing the decoded authentication challenge to determine at least one challenge parameter on which to base a response. The methods may further include generating a response to the challenge based at least in part on the at least one challenge parameter determined, and answering the challenge with the generated response.

In some embodiments, a tangible non-transitory computer-readable medium with computer-readable instructions recorded thereon is provided. The computer-readable instructions, when executed by a processor of a device, may be configured to cause the device to establish an optical link with another device displaying an encoded challenge. The encoded challenge may take the form of machine-readable indicia. The computer-readable instructions may also be configured to cause the device to decode the encoded challenge, generate a response from decoded information of the machine-readable indicia (optionally, together with user information and/or server information) and send this response to an authentication server.

Additional embodiments and features are set forth within the description that follows, and in part will become apparent to those skilled in the art upon examination of the specification, or may be learned by the practice of the disclosed embodiments. The features and advantages of the disclosed technology may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

The Challenge-Response ("CR") process is one authentication mechanism that enhances the level of security in online transactions. In many such systems, the longer the challenge and response data, the stronger the level of security. In some conventional mobile technologies, a challenge may be posed to the user in some human-perceivable medium, such as being displayed in a web page. The user may then type this challenge onto the user's mobile device. The mobile device may then develop a response, such as an OTP, based at least in part on the challenge and some shared secret between the client and an authentication server or service. The response may then be communicated to the authentication server or service. If the challenge and/or response data is long, the user may make mistakes while copying it, or it may not be feasible to copy the challenge data for several reasons, such as, for example, lack of sufficient time. However, increasing the length of the challenge data may make the CR authentication scheme more secure.

Figure 1:
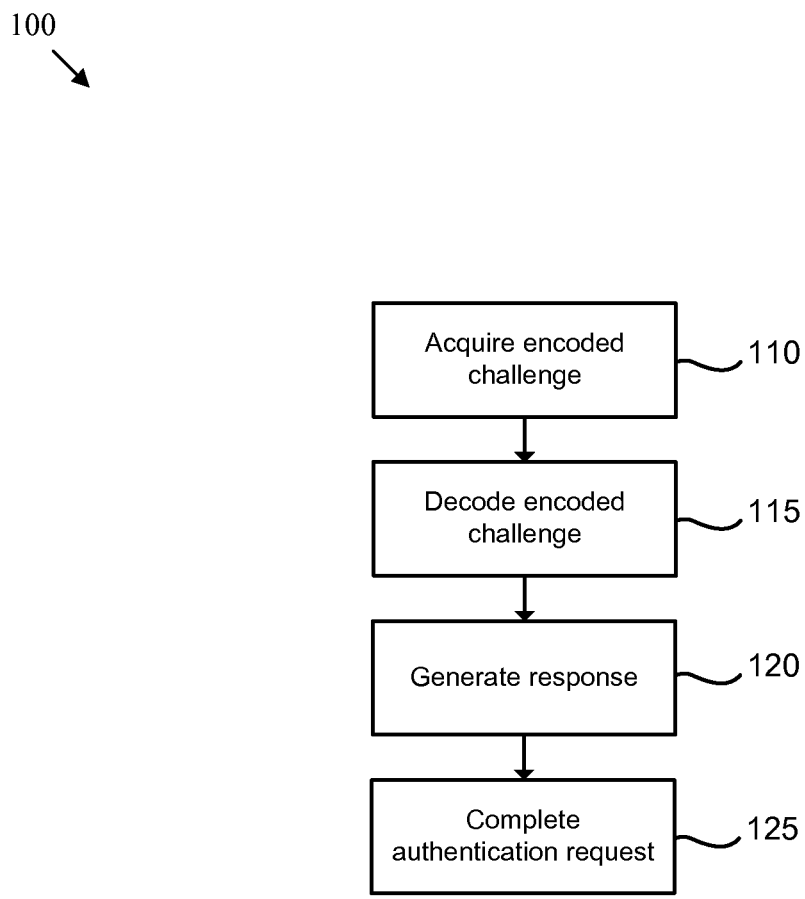
FIG. 1 shows a flowchart of a method of authenticating a user having a mobile device according to disclosed embodiments.

In order to provide enhanced protection schemes, yet also provide ease of use and precision for clients, embodiments of the present technology may allow for a mobile device user to respond to authentication challenges using a mobile device. As shown in FIG. 1, a method is described for responding to an authentication challenge using a mobile device. A user may acquire 110 an encoded challenge using an optical recognition device included in or otherwise electronically coupled to the mobile device, and the challenge may be associated with a challenge-response authentication scheme. The user may first access an application on the mobile device that has been previously acquired for providing responses within a challenge-response authentication scheme. In alternative embodiments, the user may access the application which may, for example, provide instructions for acquiring a challenge. The user may instead capture a challenge using the optical recognition device associated with the mobile device, and then either select an option for utilizing an application for responding to an authentication challenge, or access the application in some other way. In still another example, the user may enter a PIN or password prior to gaining access to the application on the mobile device.

The challenge may be acquired 110 visually using a camera or other optical recognition device associated with the mobile device. In one example, a user may use a camera associated with the mobile device to take a picture of the challenge presented. The challenge may be presented by a challenger associated with an application, service, or device, such as a secured server or storage device, that a user is attempting to access. For example, the challenger may be a webpage or application that a user is attempting to access. The challenge could be presented as a binary string, a text string, bar code, quick response ("QR") code, machine-readable indicia, image, etc. For example, QR codes may be used to provide additional security over a conventional string of text. In some implementations, QR codes may encode up to 2,953 bytes of data or more. A QR code presented as a challenge may be read by QR scanners, cell phones with cameras, smartphones, and other devices with optical links.

Users with a mobile device equipped with the correct reader application may scan or otherwise optically acquire the image of the QR code, barcode, or other machine-readable indicia to cause the challenge data to be received by the mobile device and subsequently automatically processed by the mobile device. Because the challenge data is encoded, automatically acquired using an optical link, and automatically decoded, much longer challenges may be supported. For example, in some embodiments the encoded challenge data is equal to or greater than 128 bytes. In some embodiments, the encoded challenge data is equal to or greater than 256 bytes, 512 bytes, 1024 bytes, 10 kilobytes, 100 kilobytes, 1 megabyte, etc., or more.

Machine-readable indicia, such as one-dimensional barcodes, two-dimensional barcodes, watermarks, and quick response ("QR") codes, etc. may also be used to encode the challenge data in machine-readable form. This machine-readable indicia may then be displayed to the user on a display device and captured by the user using an optical link. The optical link may be created using a portable scanner, camera, or other optical device. The machine-readable indicia may also encode server data, e.g., URL data, so that this data may be automatically provided to a challenge-response (CR) module of the mobile device. The CR module may support the OATH Challenge Response Algorithm (OCRA), EMV, or any other type of CR authentication protocol.

The user mobile device may include programming to allow the reading of QR or other codes, and many mobile devices come with such systems standard. For example, Google's mobile Android™ operating system supports the use of QR codes natively on some models, and the browser supports Uniform Resource Identifier (URI) redirection, which allows QR codes to send metadata to existing applications on the device. Nokia's Symbian™ operating system also supports a barcode scanner, which is able to read QR codes. These systems are discussed merely as examples, and any system that allows the reading of such codes may be acceptable for use in embodiments of the technology.

Once the challenge has been acquired by the mobile device, the challenge may be decoded 115 or converted in order to recognize the challenge. An application stored on the mobile device, such as a CR module, may be used for decoding the encoded challenge. The decoding may be based on a common secret to the application and challenger that provides a key to deriving data translated from the image, or instead may provide the method for deriving needed information from an image, or code presented as a challenge. One way this may be accomplished involves using the shared secret as the encryption key to transmit some randomly-generated information, such as the challenge. In other examples, the application may translate the encoded challenge from which a response may be generated. For example, the challenge picture or QR code may translate to a string of text or data that may be analyzed to provide information to the application on the mobile device for generating a response string of text or data.

After the challenge has been decoded, the mobile device may generate a response 120 that may be used by the user to access that which is being protected by the challenge. The response may be an OTP in some embodiments, and may be generated based on information included in the challenge. For example, if a common key was used to decipher the challenge, the application on the mobile device may then generate and return as its response a similarly-encrypted value which is some predetermined function of the originally-offered information, thus proving that it was able to decrypt the challenge. In one example, the challenge may be an encrypted counter integer N, while the response may be the encrypted counter integer N+1, or some other function involving N, whereby returning such a value provides proof that the user was able to decrypt the integer N from the initial challenge. In other variations, a hash function operates on a password and a random challenge value to create a response value.

In some encryption schemes, such encrypted or hashed exchanges while not directly revealing the shared secret to an eavesdropper may supply enough information to allow an eavesdropper to deduce the password, using a dictionary attack or brute-force attack, for example. However, by utilizing a mobile device to optically acquire the challenge and then using the mobile device to generate the response, the device is not connected to the device offering the challenge, and hence eavesdropping may be better prevented. In other embodiments of the present technology, the use of information may be randomly generated on each exchange so that the response is different from the challenge, which may guard against the possibility of a replay attack. In such a scenario, a malicious intermediary records the exchanged data and retransmits it at a later time to deceive one end into thinking it has authenticated a new connection attempt from the other. By providing routinely changing challenges and responses, this attack may be better thwarted by not providing an opportunity to utilize the purloined information from a previous authentication.

Authentication protocols may also employ a random cryptographic nonce as the challenge to ensure that every challenge-response sequence is unique. This may provide protection against a replay attack. If it is impractical to implement a true nonce, a strong cryptographically secure pseudorandom number generator and cryptographic hash function can generate challenges that are highly unlikely to occur more than once. Mutual authentication may be performed using a challenge-response handshake in both directions; the server ensures that the client knows the secret, and the client also ensures that the server knows the secret, which protects against a rogue server impersonating the real server.

After the mobile device has generated the response 120, the authentication request may be completed 125. The authentication may be completed in-band by the user of the mobile device, or out-of-band by the mobile device over a network, which may be a secured network in some embodiments. The response that is generated may be displayed to the user on the mobile device such that the user may enter the response on the device presenting the challenge. Alternatively, the response may be transmitted to an authentication server that is in communication with the device presenting the challenge. In some embodiments, authentication may be performed by the device presenting the challenge, in which case the response may be transmitted directly or indirectly to the device presenting the challenge. After the authenticating server has received a response and verified its authenticity, the server may relay to the device presenting the response that the user should be allowed access, or be allowed to proceed with the transaction presently being attempted. Alternatively, if the authentication server determines that the response fails the challenge, the server may provide a message back to the mobile device indicating that the transaction or access attempt has failed. This message may then be displayed to the user. Where the authentication server is separate from the device presenting the challenge, the authentication server may additionally or alternatively communicate with the device presenting the challenge that the user has failed the challenge, and the transaction or access attempt may be terminated. Subsequent attempts may be provided including providing an additional challenge for a renewed response attempt by the user.

In one embodiment, the response may be generated and displayed to the user. The user may then type the displayed response into the device presenting the challenge. Alternatively, when the response has been generated, a message may be displayed on the mobile device to the user requesting an additional input by the user. For example, the message may request permission by the user to transmit the generated response to an authentication server or, in some embodiments where authentication is performed by the device presenting the challenge, to the device presenting the challenge. The message may include other information including whether a secure or open communication channel exists, or other information by which the user may make a more informed decision as to whether the user should allow the authentication to proceed. Messages presented to the user may also include error information, or information explaining that the acquired challenge could not be decoded. For example, if a camera associated with a phone is used to acquire the image, potential movement of the phone during the image capture may distort the acquired challenge such that it cannot be decoded. In one example, a check is performed by the mobile device to determine if the acquired challenge is adequately perceptible. If not, a message may then be presented to the user indicating such information and requesting that the user re-capture the encoded challenge.

Such challenge-response authentication schemes may help solve the problem of exchanging session keys for encryption in some examples. Using a key derivation function, the challenge value and the secret may be combined to generate an unpredictable encryption key for the session. This is particularly effective against a man-in-the-middle ("MITM") attack, because the attacker will not be able to derive the session key from the challenge without knowing the secret, and therefore will not be able to decrypt the data stream.

Figure 2A:
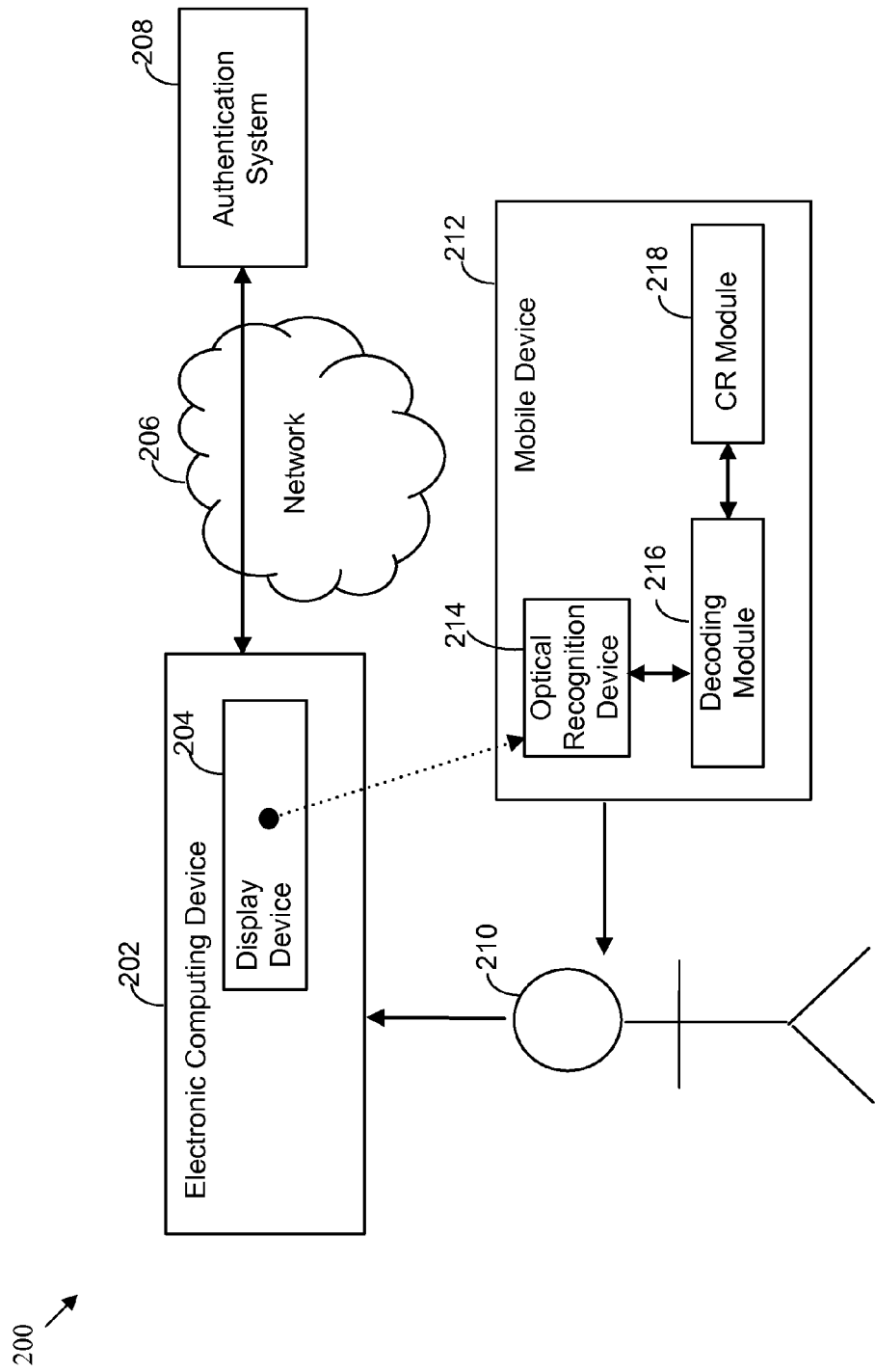
FIG. 2A shows a simplified system for supporting authentication in accordance with a first embodiment of the present invention.

FIG. 2A shows a simplified system 200 for supporting authentication in accordance with a first embodiment of the present invention. User 210 of mobile device 212 may acquire an encoded challenge using optical recognition device 214 of mobile device 212. Optical recognition device 214 may be integrated with mobile device 212 or communicatively coupled thereto via a wired and/or wireless mechanism. For example, optical recognition device may be communicatively coupled to mobile device 212 via a USB, serial, or other mechanical interface, and/or via an IEEE 802.11, Bluetooth, or other wireless connection using any suitable communication protocol. The encoded challenge may be displayed on display device 204 of electronic computing device 202. Electronic computing device 202 may be attempting to connect to a server or service related to authentication system 208 over network 206. For example, authentication system 208 may be a third-party authentication engine operable to handle authentication requests on behalf of a network server or network service that user 210 is trying to access.

Those skilled in the art will readily understand that terms such as "user," etc., are representative of the entities on either side of a transaction and should not be limited to individuals. For example, a user could be an individual using a mobile device, a corporate entity, a bank or other financial institution, a government agency, a computer system attempting to access a server or service related to authentication system 208 with a mobile type device, or any other suitable entity wishing to engage in a transaction, or potentially attack such a system. Authentication system 208 may be protecting any client, and exemplary clients may include a merchant, a retailer, a bank or other financial institution, a government agency, an individual, an email account system, or numerous other entities that operate to control access to a secured resource. Further, those skilled in the art will readily understand that the term "authentication system" may be representative of an entity or system that may or may not be a party to the transaction, but rather a party responsible for verifying an identity of the user. For example, the authentication entity could be an individual, a corporate entity, a bank or other financial institution, a government agency, a server or server system, or any other suitable entity responsible for verifying an identity of the user privy to the transaction.

Mobile device 212 may be any suitable device that is operable to enable a user to interact with at least one of electronic computing device 202 and authentication system 208. For example, mobile device 212 might be a personal digital assistant (PDA), a smart phone such as the iPhone™ or BlackBerry™, a laptop computer, a digital music player, a webpage or active server page (ASP), a monitor, personal television or other display device, a dedicated device for carrying out the operations of the invention, a hardware token or card that is synchronized with other hardware devices and that may allow for user input, and/or a pin pad with a wired or wireless communication port. These examples are illustrative of the types of technology that can be used for mobile device 212, and they are not meant to limit the devices that could be used. Technological advances in devices such as PDA's, smart phones, display devices, user interfaces, smart cards, and microchip-enabled credit, debit, and identification cards could also be used in the future to facilitate the authentication mechanisms discussed herein with a mobile device. Accordingly, mobile device 212 may include any suitable number of elements discussed with reference to FIG. 5.

Electronic computing device 202 may be any suitable hardware device capable of displaying a challenge that may be optically acquired by a user with a mobile device 212. Electronic computing device 202 may include a display device 204 operable to display a challenge and other suitable information. Display device 204 may be any suitable display device 204, such as a computer monitor, a merchant point-of-service device, a television, etc. Display device 204 may be operable to display the challenge and other suitable information using any suitable software mechanism. For example, the challenge may be displayed in a web browser executed by electronic computing device 202, and in some embodiments the challenge may be displayed together with other information such as a URL associated with a web page via which the challenge is displayed. Electronic computing device 202 may include peripheral equipment (not shown) that may allow user input, such as a response to a presented challenge. For example, electronic computing device 202 may include a touchpad, keyboard, touchscreen, or any other suitable input device operable to receive a user input. In some embodiments, a web page displayed via display device 204 may include a data field for entering a response as displayed on mobile device 212. User 210 may view the displayed response generated by mobile device 212 and enter the response in the data field. The response may then be transmitted by electronic computing device 202 through network 206 to authentication system 208 for authentication and verification purposes.

Authentication system 208 may be any suitable electronic computing device and/or computing system that operates to verify an identity of a user and, in some embodiments, provide customized information to the user. Such user authentication may be used to authorize the user to access the resources secured by the authentication system, and in some embodiments may be a part of or communicatively coupled with a service provider system (not shown). For example, authentication system 208 may include a mainframe computer, a minicomputer cluster, a group of servers functioning as a single unit, an authorization server, a content server, storage devices, computer processors, communication interface elements, etc. In one embodiment, authentication system 208 may include a server and a database. Authentication system 208 may be operate to perform a user verification process such as by verifying the challenge presented on electronic computing device 202 with the response as entered by the user 210 on the electronic computing device 202 and transmitted to the authentication system. After verification has been made by authentication system 208, the system may respond to electronic computing device 202 that the user should be allowed access to a requested service, or that a transaction should be completed, etc.

Network 206 may be any suitable network for enabling communications between various entities, such as between mobile device 212, electronic computing device 202, and/or authentication system 208. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 206 may utilize any suitable protocol, such as TCP/IP, OSI, FTP, UPnP, NFS, CIFS, and AppleTalk™. Communication over the network may be enabled by wired or wireless connections, and combinations thereof.

Optical recognition device 214 may optically acquire the challenge data and pass this challenge data to decoding module. Decoding module 216 may decode the encoded challenge and pass the decoded challenge to CR module 218, which may take the form of an application or program executing on mobile device 212, and may generate a response based at least in part on some or all of the decoded challenge data. CR module 218 may then display the response on mobile device 212 for user 210 to enter into display device 204, for example.

In some embodiments, the CR module 218 takes as input the challenge data and some user data, such as a PIN, and generates the response based, at least in part, on the challenge data and the user data. Additional domain and URL checks may also be performed. For example in some embodiments, the CR module 218 additionally or alternatively may take as input server data, e.g., URL or address data, and generate the response based, at least in part, on the challenge data, the user data, and the server data. The server data may include the domain name of the server requesting authentication, its address, e.g., IP address or MAC address, its TLS/SSL certificate or a hash thereof, some public or private encryption key associated with the server, or any other identifying information associated with the server. Information used by CR module 218 in generating a response may be acquired using any one or more of a number of suitable data gathering techniques. In one embodiment, information used by CR module 218 may be input into mobile device by user 210. For example, mobile device 212 may include an input element (not shown) such as a keypad, keyboard, touchscreen, etc., that is operable to receive a PIN from user 210. In another embodiment, information used by CR module 218 may be acquired via optical recognition device 214 and communicated from optical recognition device 214 to CR module 218 either directly or via other elements of mobile device 212 such as decoding module 216. For example, optical recognition device 214 may acquire the input server data, e.g., URL or address data, at the same time or at a different time than acquiring the challenge data.

Figure 2B:
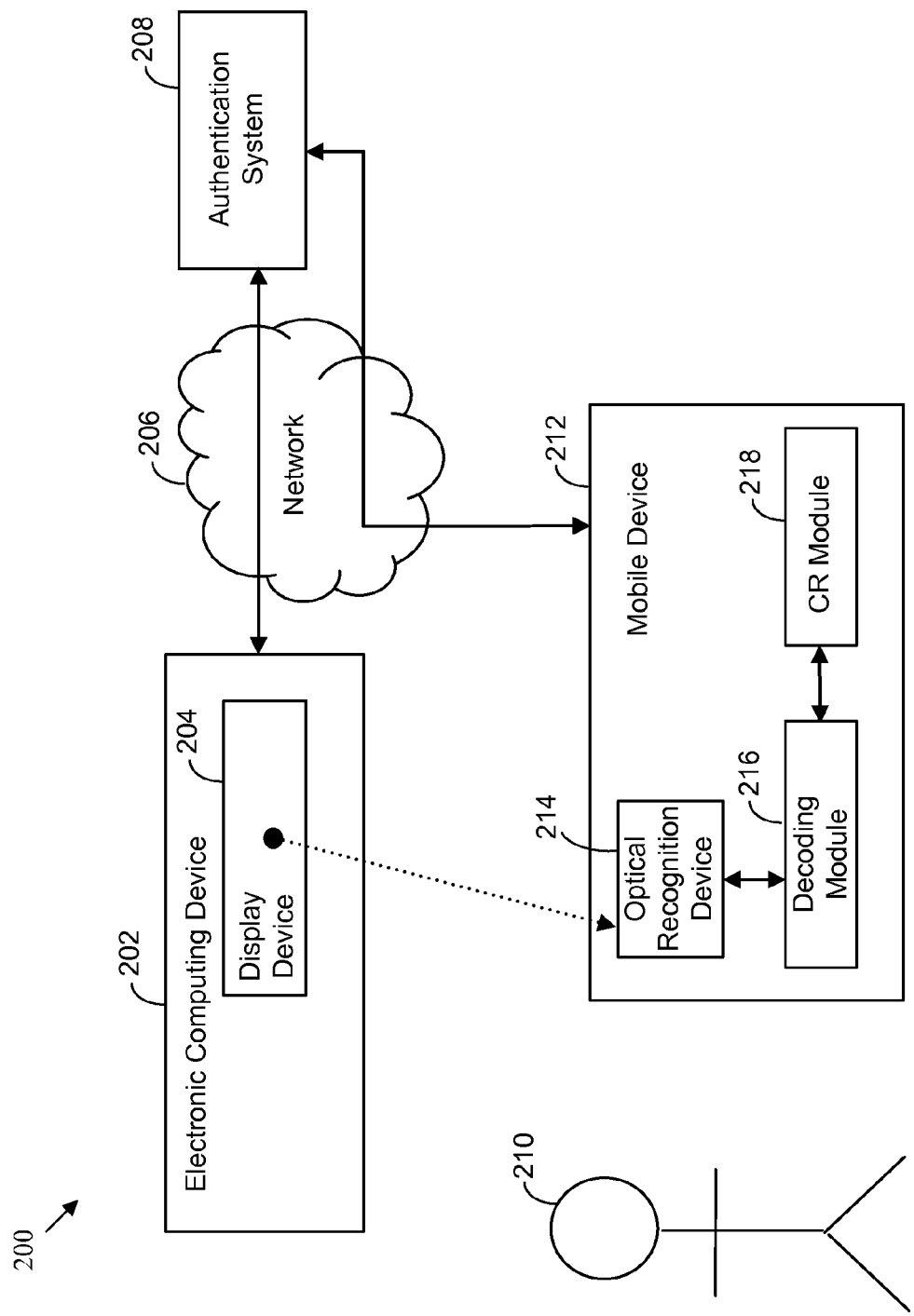
FIG. 2B shows a simplified system for supporting authentication in accordance with a second embodiment of the present invention.

FIG. 2B shows a simplified system for supporting authentication in accordance with a second embodiment of the present invention. According to this embodiment, mobile device 212 may communicate directly with the authentication system 208 which may, in some cases, prevent mistakes in the transferring of the response. In one exemplary scenario, after mobile device 212 has acquired the challenge with the optical recognition device 214, and CR module 218 has generated a response, mobile device 212 may communicate the generated response to electronic computing device 202. The response may be communicated to electronic computing device 202 via a wired or wireless connection using any suitable communication protocol. Additionally or alternatively, CR module 218 may pass this response data to authentication system 208 in-band or out-of-band. In one example, the transfer of the response from CR module 218 to authentication system 208 over network 206 occurs automatically after the response is generated. In some embodiments, mobile device 212 may prompt user 210 to allow the transfer of the response to occur. In either case, the response may be further encrypted prior to being transmitted to the authentication system 208 to provide additional protection against interception.

By maintaining mobile device 212 separately from electronic computing device 202, an OTP application executed by CR module 218 may be enhanced or strengthened. For example, whenever a challenge is offered, the mobile device may virtually connect with the challenger optically, which may be display device 204, using a camera, scanner, or other device that supports an optical link. In some embodiments, such a connection cannot be terminated or halted by electronic computing device 202 as electronic computing device 202 is not operable to control mobile device 212. The mobile device may read the required challenge information and automatically generate a response. The computed responses can be communicated back to the challenger session via the user by writing the displayed response in the browser. Additionally or alternatively, the mobile device 212 can connect to the concerned back-end authentication system 208 out-of-band and send the response directly, if the mobile device is connected to a network such as the internet. Thus, the user 210, electronic computing device 202, authentication system 208, and mobile device 212 may be well-connected to coordinate and complete the authentication task. Such a process may also provide protection from MITM attacks which may be a large concern in the case of OTP authentications.

Figure 3:
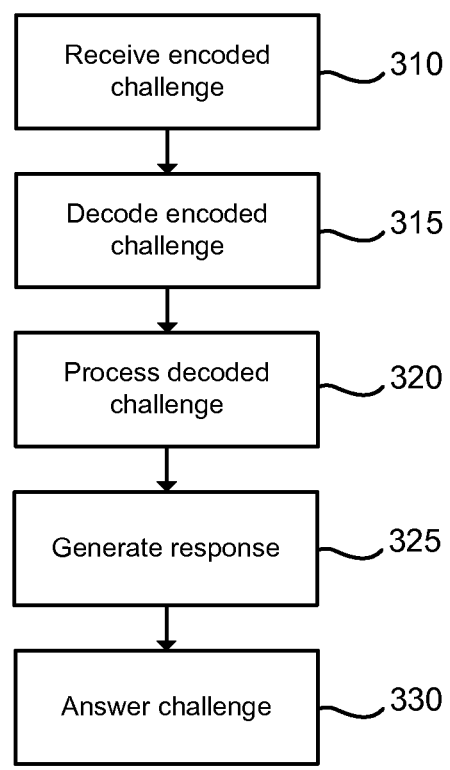
FIG. 3 shows a flowchart of a method of responding to an authentication challenge with a mobile device according to disclosed embodiments.

FIG. 3 shows a flowchart of another method 300 of responding to an authentication challenge with a mobile device according to disclosed embodiments. A mobile device having an optical recognition device may be used to respond to an authentication challenge. The challenge may be presented to a user in response to a server request for authentication. The authentication may require the use of an OTP, such as OATH and/or EMV. The user may need to generate the OTP on the mobile device using the user's PIN and some additional data such as a challenge like OCRA, transaction amount for EMV, and other relevant information. In alternative embodiments, passwords and PINS may not be required as additional levels of security. Also, the transaction amount may be transmitted automatically to the authentication system, such as by a merchant point-of-service device.

An optical recognition device associated with the mobile device may be used to receive the encoded challenge 310 in any of the ways as previously described. Additional information may be transmitted along with the challenge itself via the particular authentication scheme used. For example, the OTP application on the mobile device can detect the URL being interacted and check whether it is an intended URL or not, such as in cases where the credential is configured to trust only a specific set of URLs. The OTP application can detect the URL either by scanning the URL bar in the browser and using OCR techniques, or it can be part of the encoded challenge, such as a part of a presented QR code. The required additional data may be displayed on the web page in any number of ways, such as an encoded binary string, text string, bar code, QR code, etc. The encoded challenge may be at least 128 bytes or more in some embodiments, and in one example, the challenge may be over 1 megabyte. The optical recognition device associated with or directly connected to the mobile device may be a camera, scanner, or other device operable to capture or otherwise receive an encoded challenge.

The user may trigger the OTP application on the mobile device directly, or the application may be presented as an option for user selection when the challenge has been received. The challenge may be received as a picture from a camera, or as a translated wave from a scanner or other light-based recognition device. The OTP application may read the data on the screen directly, or may allow the received code, image, or other presented challenge to be translated or decoded 315 with or prior to use by the OTP application. For example, a barcode scanner, QR code scanner, or camera may optically acquire the data on the screen and automatically pass this data to the OTP application. The decoding 315 may include analyzing or otherwise recognizing features of an image received by a camera. Alternatively, decoding 315 may include receiving a wave form from a light-based recognition device such as a scanner. The wave form may be generated by the light-based recognition device, and then converted with a converter or other application on the mobile device into a digital signal that may then be used by the OTP application.

Prior to processing 320 the challenge, the OTP application may ask the user to enter the user's PIN number or other identifying information, such as a fingerprint, voice sample, etc. Once the user has been accepted by the OTP application, the OTP application can begin processing the decoded challenge 320. As part of or prior to the processing, the OTP application can perform additional checks, such as domain checks, network address checks, etc., if such additional details are displayed by the challenger, and received with or as part of the encoded challenge.

Processing the decoded challenge may include determining one or more challenge parameters on which a response may be based. Challenge parameters may include information such as the type of challenge being presented, and may provide guidance for the OTP application for generating a response. For example, challenge parameters may include that the challenge includes a specific number N included in the presented challenge, and that to generate the response a particular algorithm must be used to generate a response that is a function of N. Once these challenge parameters have been determined, a response may be generated 325.

The response generated may be based at least in part on the one or more challenge parameters determined by the OTP application. For example, the challenge parameter may dictate that the response must include a certain letter, number, character, symbol, or grouping thereof, and that such characters may be presented in a certain order with the response. Accordingly, the generated response 325 may incorporate the required characters or symbols in the structure stated. Once the response has been generated, the challenge may be answered 330.

The OTP application may display the OTP response to the user on the mobile device. The user may then answer the challenge by typing, writing, or otherwise transmitting the response to the challenger. Alternatively, the OTP application may automatically send the OTP to the required server out-of-band to complete the authentication. For example, the OTP application may initiate a new communication with an authentication server over a secured or non-secured public or private network, such as the Internet. Under either scenario, strengthened authentication protection may be provided against MITM or other types of attacks.

Once the challenge has been answered, the OTP application may receive a response from the server indicating whether or not the user was successfully authenticated. The authentication server may authenticate the user using a known protocol, such as OATH and/or EMV. This response may be sent out-of-band from the initial challenge, the resultant OTP, or both. For example, the initial challenge may be received over communication link A, the OTP sent over communication link B, and the authentication response sent over communication link C. In some embodiments, the authentication response may be sent over the same link as the challenge or the OTP. Utilizing such authentication schemes may provide increased security by establishing virtual connections between the client machine or browser presenting the challenge, OTP application on the mobile device, and the back-end server.

Figure 4:
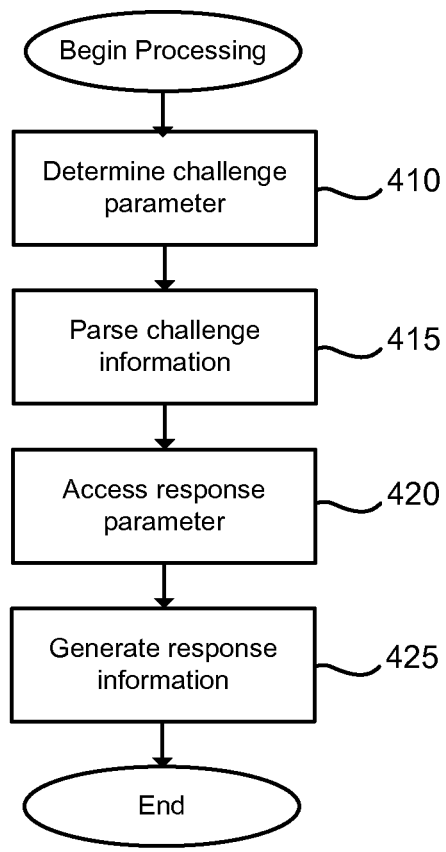
FIG. 4 shows a flowchart of a method of processing a decoded authentication challenge according to disclosed embodiments.

FIG. 4 shows a flowchart of a method of processing a decoded authentication challenge according to disclosed embodiments of an OTP application operating on a mobile device. The decoded challenge may be reviewed or analyzed in order to determine or otherwise recognize one or more challenge parameters 410. The challenge parameters may provide instruction regarding information contained in the challenge, how a response should be formatted, what information the challenge may contain, some combination of these, etc., or other parameters that can be determined by the OTP application.

Once challenge parameters have been determined, the challenge may be reviewed for unique challenge information. The OTP application may parse this unique challenge information 415 to extract information that may be needed for incorporation in the response. For example, the challenge parameter may instruct that the challenge includes some number that must be used in the response. The OTP application may then review the challenge to parse the number that may be unique to the challenge presented. This parsed information may then be used in generating the response. The OTP application may then access a response parameter 420, or alternatively the response parameter may be included with the presented challenge. As one example, the OTP application may include a secret algorithm that produces a response based on the unique challenge information. The OTP application may recognize what response parameter to use based on the challenge parameter, or the application may recognize the response parameter in the presented challenge. The response parameter may provide instruction as to how the response should be generated. For example, the response parameter may indicate that the response include a number that is one higher, or N+1, than the number that has been parsed in the challenge as the unique challenge information. As will be understood by one of skill, any number of functions may be performed based on the unique challenge information, including a function of a number, a character or letter selected based on a different character or letter, a symbol that is a transformation of a different presented symbol, etc. The parameters may also provide ways of encoding response information, etc.

Unique response information may then be generated 425 as a result of the response parameter. The unique response information may be a function of the unique challenge information, or some other transformation or manipulation, which may include merely resending the identified unique challenge information, which may indicate knowledge of the parameters or system being used. As one complete example that is not intended to limit the scope of the technology, the challenge parameter recognized may be that the challenge includes a number N. The challenge may then be reviewed by the OTP application to parse out that the number unique to this challenge is 176. A response parameter may be identified in the challenge, or accessed from the OTP application or some other source that instructs that a response include a number N×2. Accordingly, from this response parameter, response information is generated based on the unique challenge information 176. The generated unique response information in this example would be 352. This unique response information may become the entire OTP response, or may be included with other information to form a complete response. For example, other challenge or response parameters may indicate that the unique response information be included in some pattern, text string, or other response information in some way. The generated complete response may be displayed to the user, transmitted to the challenger or some authentication system, or further encrypted prior to the displaying or transmitting, such that the response may then be used to answer the challenge.

Figure 5:
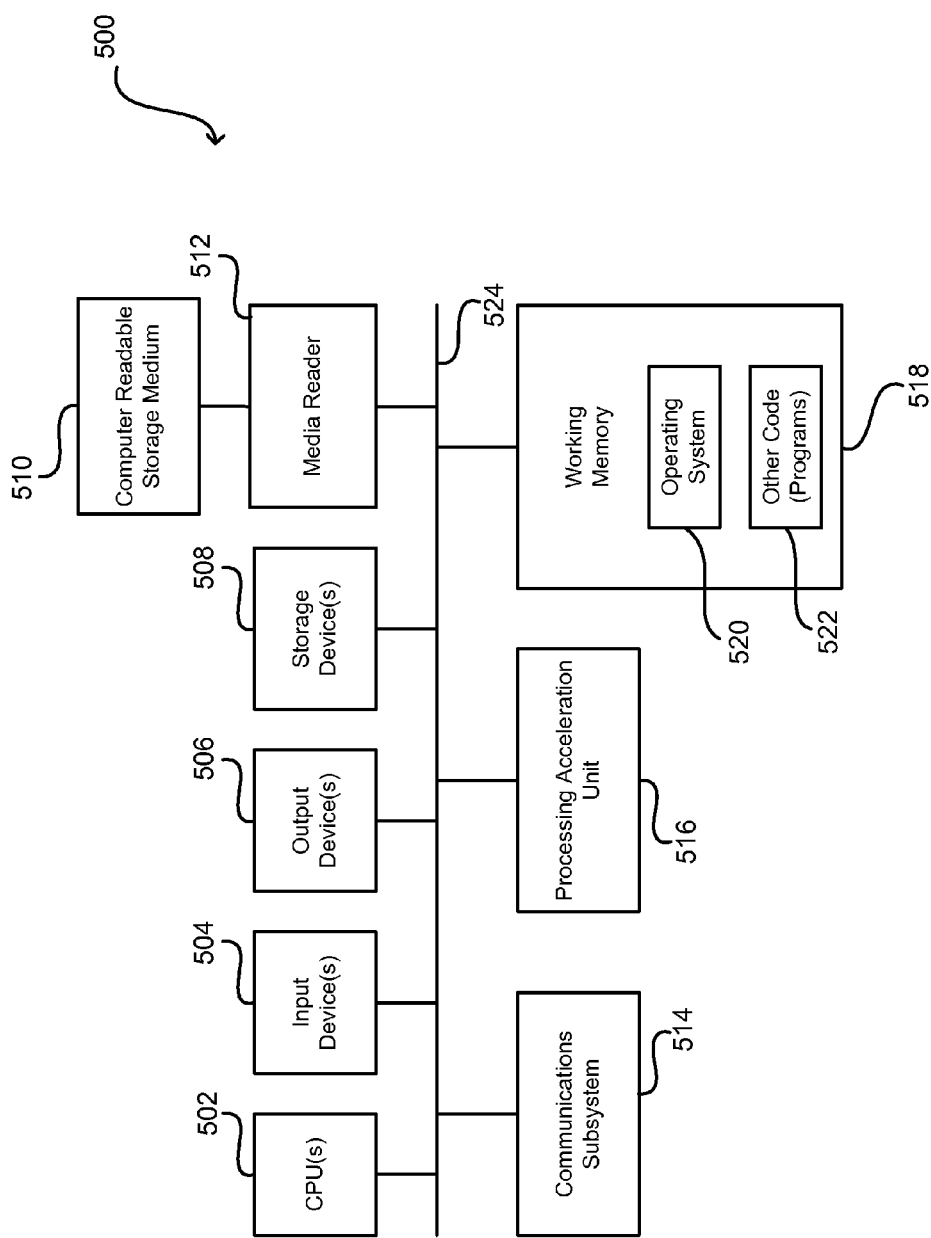
FIG. 5 shows a simplified block diagram illustrating the physical components of a computer system that may be used in accordance with disclosed embodiments.

FIG. 5 is a simplified block diagram illustrating the physical components of a computer system 500, or mobile device, that may be used in accordance with an embodiment of the present invention. This diagram is merely an example, which should not unduly limit the scope of the claims. One of ordinary skill in the art would recognize many variations, alternatives, and modifications.

In various embodiments, computer system 500 may be used to implement any of the electronic computing devices 202, mobile devices 212, or authentication systems 208 illustrated in system environment 200 described above. As shown in FIG. 5, computer system 500 comprises hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). For example, the input devices 504 are used to receive user inputs for procurement related search queries. Computer system 500 may also include one or more storage devices 508. By way of example, storage devices 508 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 508. For example, the central processing unit(s) 502 is/are configured to retrieve data from a database and process the data for displaying on a GUI.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage devices 508) comprehensively representing remote, local, fixed, and/or removable storage devices plus storage media for temporarily and/or more permanently containing computer-readable information. Communications subsystem 514 may permit data to be exchanged over network 206 of FIGS. 2A and B with any suitable electronic device described above with respect to network environment 200.

Computer system 500 may also comprise software elements, shown as being currently located within working memory 518, including an operating system 520 and/or other code 522, such as an application program (which may be a client application, Web browser, mid-tier application, RDBMS, etc.). In a particular embodiment, working memory 518 may include executable code and associated data structures for one or more of design-time or runtime components/services. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 500.

In one set of embodiments, the techniques described herein may be implemented as program code executable by a computer system (such as a computer system 500) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

As used herein and in the appended claims, the singular forms "a", "an", and "the" include plural references unless the context clearly dictates otherwise. Thus, for example, reference to "a server" includes a plurality of servers, and reference to "the application" includes reference to one or more applications and equivalents thereof known to those skilled in the art, and so forth.

Also, the words "comprise", "comprising", "include", "including", and "includes", when used in this specification and in the following claims, are intended to specify the presence of stated features, integers, components, or steps, but they do not preclude the presence or addition of one or more other features, integers, components, steps, acts, or groups.

The invention has now been described in detail for the purposes of clarity and understanding. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for authenticating a user having a mobile device comprising:
   optically acquiring encoded challenge data using the mobile device, wherein the encoded challenge data is associated with a challenge-response authentication scheme;
   in response to optically acquiring the encoded challenge data:
   (a) decoding the encoded challenge data resulting in decoded challenge data; and
   (b) generating a response based at least in part on the decoded challenge data, the response being associated with the challenge-response authentication scheme; and
   completing an authentication request using the generated response, wherein completing the authentication request comprises displaying the generated response on the mobile device and accepting user input corresponding to the displayed generated response on an electronic device other than the mobile device.

2. The method of claim 1, wherein completing the authentication request comprises transmitting the generated response from the other electronic device to a requesting server in-band.

3. The method of claim 1, wherein the encoded challenge is acquired from a web page on which the encoded challenge is displayed as machine-readable indicia, the web page is displayed on the other electronic device.

4. The method of claim 3, wherein the displayed encoded challenge data comprises a QR code and wherein optically acquiring the encoded challenge data comprises creating an optical link with the QR code using a scanner or camera associated with the mobile device.

5. The method of claim 4, further comprising sending metadata associated with the QR code to a module on the mobile device that generates the response.

6. The method of claim 1, wherein the generated response comprises a One-Time Password (OTP).

7. The method of claim 1, wherein the encoded challenge data comprises at least 128 bytes of data.

8. A method of responding to an authentication challenge with a mobile device associated with an optical recognition device, the method comprising:
   receiving an encoded authentication challenge via the optical recognition device;
   decoding the encoded authentication challenge;
   processing the decoded authentication challenge to determine at least one challenge parameter on which to base a response;
   generating a response to the challenge based at least in part on the determined at least one challenge parameter; and
   answering the authentication challenge with the generated response, wherein answering the challenge comprises displaying the response on the mobile device.

9. The method of claim 8, wherein answering the challenge comprises transmitting the response to an authentication server.

10. The method of claim 9, wherein answering the challenge comprises encoding the generated response prior to transmitting it to the authentication server.

11. The method of claim 8, wherein processing the decoded authentication challenge comprises:
    recognizing the at least one challenge parameter on which to base a response;
    parsing unique challenge information included in the decoded authentication challenge in response to recognizing the at least one challenge parameter;
    accessing at least one response parameter that is based on the at least one challenge parameter recognized from the decoded authentication challenge; and
    generating unique response information according to the at least one response parameter, the unique response information being based on the parsed unique challenge information.

12. The method of claim 11, wherein generating the response comprises incorporating the unique response information with other information to form a complete response.

13. The method of claim 12, wherein the complete response is encrypted prior to answering the challenge.

14. The method of claim 8, wherein the optical recognition device comprises a camera included in the mobile device, and decoding the encoded authentication challenge comprises recognizing features of an image received by the camera.

15. The method of claim 8, wherein the optical recognition device comprises a light-based recognition device included in the mobile device, and decoding the encoded authentication challenge comprises receiving a wave form generated by the light-based recognition device and converting the wave form into a digital signal.

16. The method of claim 8, wherein the encoded authentication challenge is included in a code selected from the group consisting of a QR code, a bar code, and an encoded image.

17. A tangible, non-transient computer readable medium comprising instructions stored thereon which, when executed by a processor, cause a computer to:
    acquire encoded challenge data via an optical recognition device communicatively coupled to the computer, wherein the encoded challenge data is associated with a challenge-response authentication scheme, the encoded challenge data is displayed by an electronic device other than the computer;
    in response to acquiring the encoded challenge data:
    (a) decode the encoded challenge data resulting in decoded challenge data; and
    (b) generate a response based at least in part on the decoded challenge data, the response being associated with the challenge-response authentication scheme; and
    complete an authentication request using the generated response, wherein the instructions which cause the computer to complete the authentication request comprise instructions that cause the computer to display the generated response.

18. The method of claim 1, wherein the encoded challenge data is displayed by the other electronic device.

19. The method of claim 8, wherein the answering the authentication challenge with the generated response further comprises accepting user input corresponding to the response displayed on the mobile device on an electronic device other than the mobile device.

20. The method of claim 19, wherein the encoded authentication challenge is displayed by the other electronic device.

* * * * *